Sept. 1, 1931.  C. R. BOWERS  1,820,906
CONTROL DEVICE FOR AEROPLANES
Filed June 7, 1930
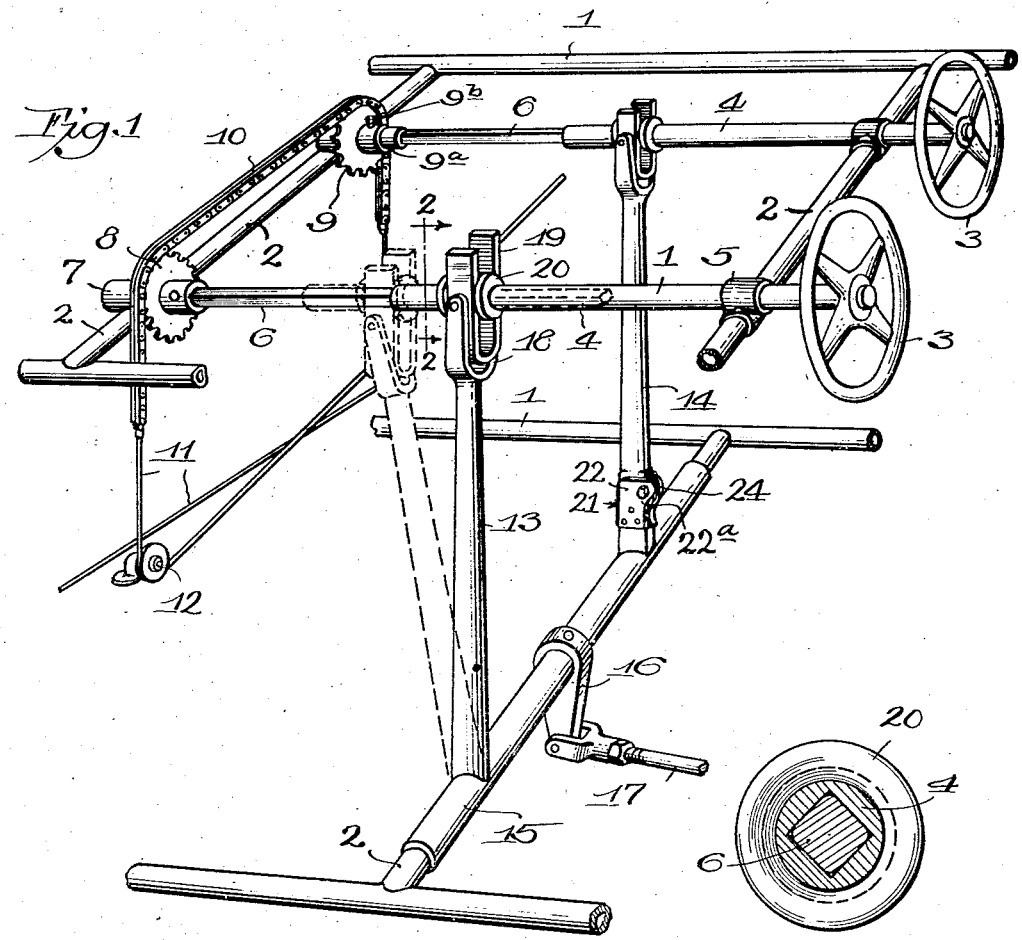
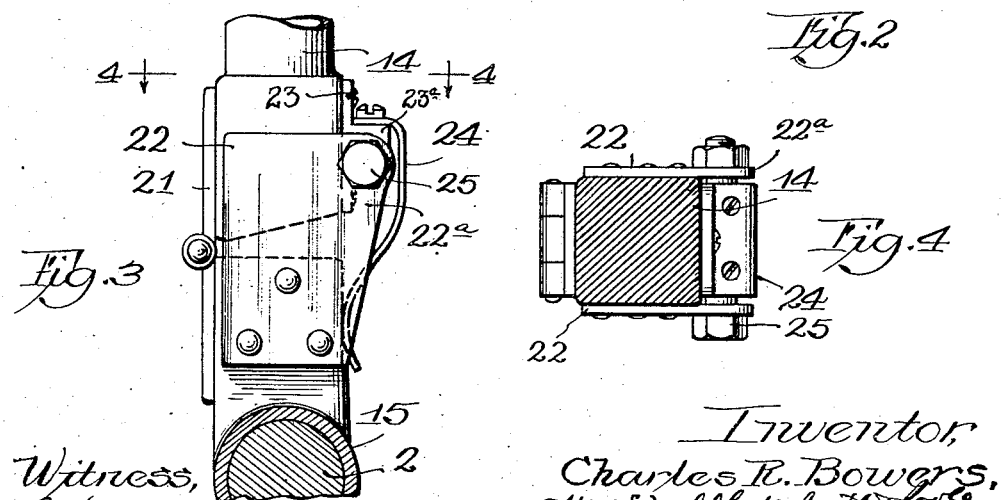
Witness,
Chas. R. Koursh
Inventor,
Charles R. Bowers Patented Sept. 1, 1931

1,820,906

UNITED STATES PATENT OFFICE

CHARLES R. BOWERS, OF SOUTH BEND, INDIANA, ASSIGNOR TO CHARLES T. STEDMAN, OF SOUTH BEND, INDIANA, AS TRUSTEE

CONTROL DEVICE FOR AEROPLANES

Application filed June 7, 1930. Serial No. 459,638.

This invention relates to improvements in control devices for aeroplanes, and more particularly to apparatus for controlling an aeroplane in flight, and including a dual set of controls.

The object of the invention is to provide an improved wheel control for the elevators and ailerons, so designed that the same are responsive to the simultaneous turning of the wheel in either direction, and a forward and backward horizontal axial shifting of the wheel. A further object of the invention is to provide a simple and effective method of disconnecting one of the dual controls so that its wheel is free to turn and shift, and yet is quite ineffective in controlling the aeroplane.

A preferred embodiment of the invention is disclosed in the accompany drawings, in which Figure 1 is a perspective view of the complete control apparatus, Figure 2 is an enlarged detail view in cross section taken on line 2—2 of Figure 1, Figure 3 is an enlarged detail view in side elevation of the hinged connection at the lower end of one of the elevator control levers, and Figure 4 is a detail view in section taken on line 4—4 of Figure 3.

The control apparatus is shown in Figure 1 as located in a forward compartment of the aeroplane fuselage which would be at the front of the passenger compartment in a cabin type plane, or the cockpit in a plane of the open type. For convenience only the skeleton frame work of the fuselage immediately adjacent the control apparatus is shown, namely, the upper and lower longitudinals of longérons 1 and the cross members 2, 2, the space between the upper pair of cross members indicating generally the control compartment. Seats for the pilot and passenger are arranged side by side behind the two wheels 3, 3 of the dual controls. As will be presently seen, the control unit on the near side is the main control while the other unit is the auxiliary or secondary control, and except for the structural features which permit the latter to become inoperative, the two are duplicates of each other.

Referring to one of the units, the wheel 3 is fixed to the end of a tubular shaft 4 extending horizontally in a fore and aft direction and slidably mounted in a bracket 5 fixed to the upper rear cross frame member 2 just in front of the wheel. The opposite end of the shaft 4 has telescopic engagement with the end section of a square shaft 6 journalled at its forward end in a bearing bracket 7 carried by the forward cross member 2. The tubular shaft 4 has a square bore extending inwardly some distance from its free end, and in which the adjacent end portion of the square shaft slides, the length of the latter being sufficient to provide ample bearing in all positions of the external tubular shaft which, as is now apparent, is free to slide forwardly and rearwardly through a predetermined distance on the square internal shaft 6, and turning the same in either direction.

Keyed to the square shaft 6 adjacent its bearing bracket is a sprocket pinion 8, there being a corresponding pinion 9 mounted on the square shaft 6 of the other control unit. A sprocket chain 10 passes over and downwardly around these pinions, their ends being connected with flexible cables 11, 11 which pass around guide sheaves 12, 12 and then laterally to the ailerons at the outer end of the wings. As well known in the art, the ailerons are hinged sections along the trailing edges of the wings which control the side to side tilting of the plane, by depressing one as the other is elevated, and vice versa. Thus considering the aileron control only, it will be noted that by rotating either wheel 3, 3 the two pairs of telescoping shafts 4 and 6 rotate in unison, and the control is thus dual.

In somewhat the same manner the forward and backward sliding movement of the wheels 3, 3 and the tubular shaft sections 4, 4 control the elevators, at the tail of the fuselage through upright lever arms 13, 14 which are fixed to or integral with a tubular cross shaft 15, preferably journalled on the lower cross member 2 of the fuselage located forwardly of the pilot's seats. A crank arm depending from the cross shaft 15 is connected with a rod 17 extending rearwardly and having aperture connection with the elevators, which have the action of horizontal rudders for controlling the angle of flight with respect to the horizontal.

The upper end of each of the lever arms 13 and 14 is bifurcated to form a saddle-like support 18 for a U-shaped yoke 19 pivotally mounted midway of its ends between the ends of the support 18. The yoke 19 straddles a collar 20, fixed to each tubular shaft section 4 near its forward end, said collars having radial flanges at each end embracing the edges of said yokes. Thus it is seen that in the straight line movement of the shafts 4, 4 in pulling or pushing the wheels rearwardly and forwardly, a rocking motion is transmitted to the levers 13 and 14 to oscillate the cross shaft 15, these parts moving as a unit to provide dual control for the elevators just as the rotation of the wheels forms a dual control for the ailerons.

Referring now to the provisions for converting the apparatus into a single control, that is, by rendering one of the units inoperative, it may be again assumed that the one on the left or near side is the main or permanent control unit, and the other is the one that can be made inoperative so that the wheel rotates and slides freely but without effect. Thus to disconnect the secondary control unit from the ailerons, the sprocket pinion 8 instead of being fixed to its shaft 6 is journalled on a bushing 9a, which in turn is fixed to the shaft, and a bolt or set screw 9b passing through the hub portion of the pinion may be adjusted so that the pinion is made fast to the bushing or may turn loosely thereon. Thus to disconnect the secondary aileron control it is only necessary to release the set screw 9a, whereupon the pinion 9 will merely idle on the bushing.

For rendering the elevator control inoperative through the right hand wheel, the vertical lever 14 is provided with a hinged joint near its lower end, which can be loosened so that the portions above and below merely flex at the hinge without the movement of one being transmitted to the other. Thus as shown in Figure 3, the lever arm 14 is parted crosswise at a point just above the cross shaft 15, and the two sections connected by a strap hinge 21 located on the forwardly facing side of the arm, which is preferably square in section adjacent the point of hinging. Bolted to the side faces of the section of the lever arm below the hinge is a pair of upright face plates 22 having their upper free ends embracing the lower end of the upper section of the lever. The plates are mounted so that their upright edges remote from the hinge 21 extend outwardly beyond the rear face of the lever arm, and by tapering their edges the plates are increased in width near their upper ends to form a pair of ears 22a, 22a. Secured to the rear face of the upper section of the lever is a plate 23 having a boss 23a extending transversely of the space between the ears 22a, the same having a bore therethrough adapted to register with bolt holes in the ears 22a. Fixed to the boss is a strip of metal 24 bent to extend downwardly around the boss and thence into the space between the edges of the face plates with its lower end bearing on the section of the lever arm below the hinge. A bolt 25 is insertable through the registering bolt holes and bore in the boss 23a, and when in place locks the joint so that the lever arm cannot flex, and hence the elevators can be dually controlled. But when the bolt is removed the joint becomes flexible and the upper section of the lever arm merely swings about the axis of the hinge. To insure the flexing of the parts in both directions from the vertical, the lower end of the upper section is beveled or cut away to provide an inclined bottom face as shown in Figure 3.

The purpose of the plate 24 is to cover the open side of the hinge and thus prevent loose articles from becoming lodged therein and locking the lever against flexing to such an extent as to interfere with the proper control of the plane in the hands of the pilot.

In alluding to the advantages of the control apparatus herein disclosed, it may be helpful to observe that heretofore the so-called wheel control has been found practical only for large planes, while smaller planes have been equipped with the so-called "stick" control, due to its comparative simplicity, compactness and small number of parts. In these respects, therefore, the improved type of wheel control is intended to compare favorably with the stick type of control, and therefore suitable for the equipment of lighter and smaller planes. A further advantage is the arrangement which permits a straight line push and pull movement in the elevator control and the practicability with which a dual or single control may be installed and the ease with which the change from one to the other may be made.

Having set forth a preferred embodiment of my invention,

I claim:

1. In a control apparatus for aeroplanes, the combination of a pair of parallel rotative shafts, each comprising an axially shiftable section having a wheel mounted at the free end thereof, control devices operatively connected with each shiftable and non-shiftable sections of said shafts, and manually controlled by one or both of said wheels, and means for disconnecting said controls from one of said shafts without affecting their operation through the other shaft.

2. In a dual control apparatus for aeroplanes, the combination of a pair of parallel endwise shiftable shafts having wheels at adjacent ends thereof, control devices, a rock shaft operatively connected with a control device, a pair of lever arms connected with said rock shaft and having operative connection at their free ends with said shafts, one of said lever arms having a hinged joint intermediate its ends and means for locking said joint against flexing.

3. In a dual control apparatus for aeroplanes, the combination of a pair of parallel shafts journalled on the fuselage of said aeroplane, said shafts comprising telescoping sections having relatively non-rotative connection, one of said sections being shiftable axially and having a wheel at the free end thereof, pinions mounted on the non-shiftable sections of said shafts, control devices operatively connected with said pinions, a rock shaft operatively connected with another control device, a pair of lever arms connected with said rock shaft and having sliding connection at their free ends with the shiftable sections of said first mentioned shafts, one of said lever arms having a hinged joint intermediate its ends and means for normally locking said joint against flexing.

4. In a control apparatus for aeroplanes, the combination of a pair of parallel rotative shafts, each comprising an axially shiftable section having a wheel mounted at the free end thereof, pinions mounted on the rotative and non-shiftable sections of said shaft, a control device operatively connected with both of said pinions, lever arms connected with each of the shiftable sections of said shafts, another initial device operatively connected with both of said lever arms, means for adjusting the pinion on one of said shafts to turn loosely thereon, and means for rendering the lever arm connected with the same shaft inoperative, including a hinged connection intermediate its ends.

5. In a control apparatus for aeroplanes, the combination of a pair of parallel shafts having endwise shiftable sections, a pair of lever arms connected with said shiftable shaft sections, a control device operative by the rocking movement of one or both of said lever arms, one of said lever arms having a hinged joint intermediate its ends permitting the portion adjacent said shaft to flex independently of its other section, and a removably locking member for rendering said lever non-flexing at said joint.

6. In a control apparatus for aeroplanes, the combination of a pair of parallel rotative shafts, each one having axially shiftable sections with wheels mounted thereon, a rock shaft operatively connected with a control device of said aeroplane, a pair of lever arms mounted on said rock shaft and connected at their free ends with the shiftable sections of said shafts, one of said lever arms having a hinged joint adjacent said rock shaft adapted to permit the portion above to rock with the movement of its shaft, a plate fixed to the lever on one side of said hinge and overlapping the portion thereof on the other side of said hinge, and a bolt removably insertable through said plate and said overlapped portion of the lever for locking said hinged joint against flexing.

7. In a control apparatus for aeroplanes, the combination of a pair of parallel rotative shafts comprising endwise shiftable sections, each having a wheel at one end, a rock shaft operatively connected with a control device of said aeroplane, a pair of lever arms mounted on said rock shaft and connected at their free ends with the shiftable sections of said shafts and means for disconnecting one of said shafts from said control device, comprising a hinged joint adjacent the lower end of the lever arm actuated thereby, plates mounted on the portion of the arm below the hinge and embracing the portion thereof above the hinge, said plates having ears projecting from said arm on the side opposite said hinge, a removable bolt adapted to be inserted through holes in said ears for locking said hinge against flexing, and a guard member secured to said lever on one side of said joint and having a free end extending over said joint to close the space formed when said hinged portions are flexed.

Signed at South Bend, Ind., this 27th day of May, 1930.

CHARLES R. BOWERS.